Patented July 12, 1949

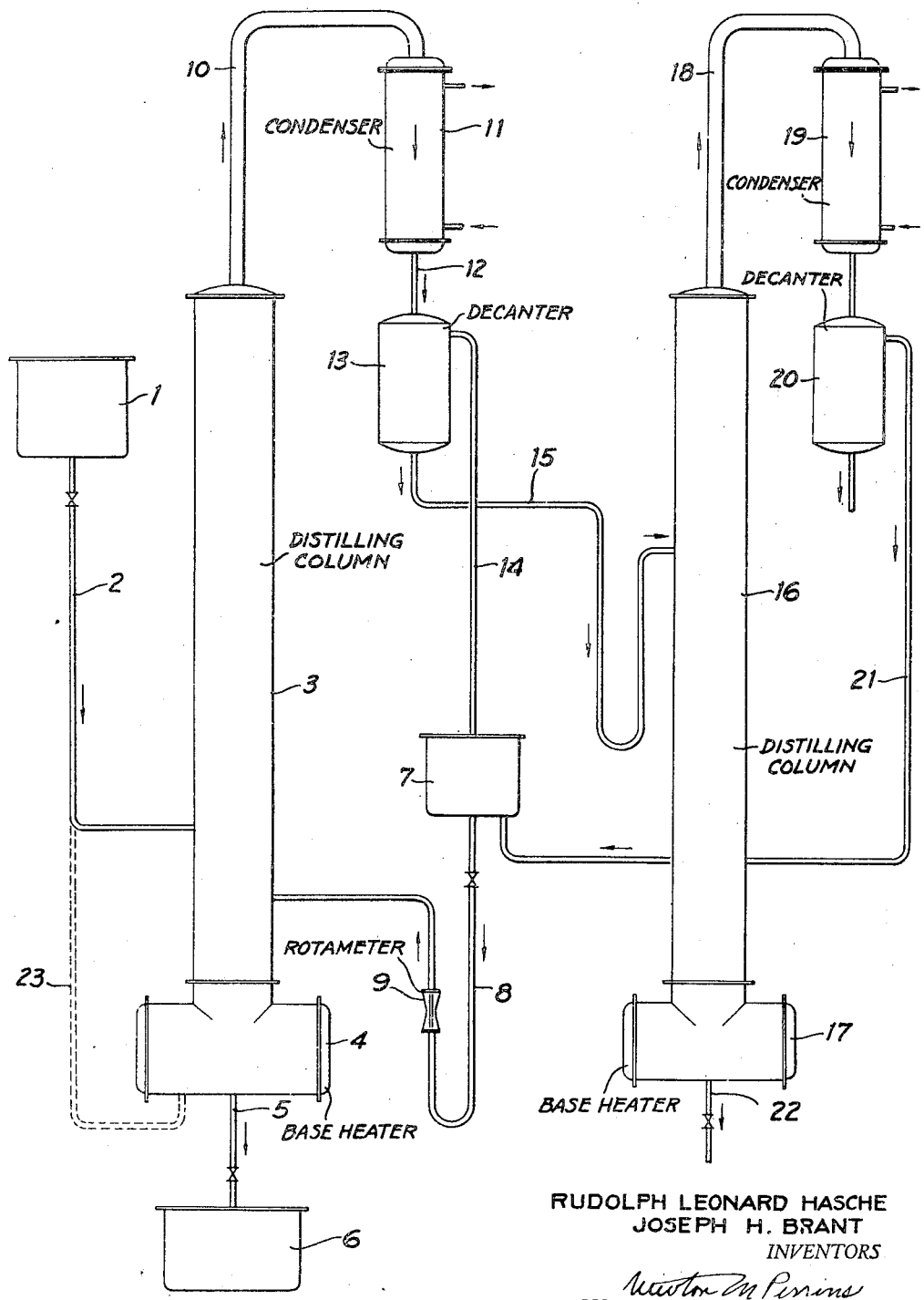

2,475,959

UNITED STATES PATENT OFFICE 2,475,959

CONCENTRATION OF AQUEOUS FORMALDEHYDE SOLUTIONS BY AZEOTROPIC DISTILLATION UNDER VACUUM

Rudolph Leonard Hasche, Kingsport, Tenn., and Joseph H. Brant, Charlottesville, Va., assignors to Eastman Kodak Company, Rochester, N. Y., a corporation of New Jersey Application May 4, 1945, Serial No. 591,866

3 Claims. (Cl. 202—42)

This invention relates to the concentration of aqueous solutions of formaldehyde and more particularly to the concentration of aqueous solutions of rather extreme dilution by azeotropic means.

As is well known, formaldehyde, which is a gas at ordinary temperatures and pressures, is used commercially in the form of its aqueous solution usually called formalin, which generally contains at a maximum about 37–40% by weight of formaldehyde. While it has heretofore been practical to concentrate aqueous formaldehyde solutions containing substantial percentages of formaldehyde, extreme difficulty has been experienced in dealing with the more dilute solutions. In fact, notwithstanding that a great deal of experimental work has been done in an attempt to concentrate such solutions, up to the present time all efforts along this line directed to the concentration of solutions containing, for example, as little as two to ten per cent formaldehyde, have proved fruitless. Failure of the methods thus far employed may be attributed to the fact that the physical properties of formaldehyde when dissolved in water are such that it is impossible to concentrate the solution by fractional distillation. It has been quite definitely established that this is because formaldehyde is present in water solution as a monohydrate or methylene glycol. Since the fugacity or vapor pressure of this compound is substantially the same as water over practically the entire temperature range from ordinary atmospheric temperatures up to the boiling point of water, it will be readily appreciated that fractional distillation is not effective for separating the two components.

A number of different expedients have been tried with the hope of successfully dealing with the more dilute formaldehyde solutions. For example, because of the fact that as the temperature is raised there is some dissociation of the monohydrate to monomeric formaldehyde, it has been proposed in fractional distillation procedures to employ a very high reflux ratio. In Hasche Patent No. 1,187,019, the use of calcium chloride as a salting out agent has been suggested as a means of concentrating dilute formaldehyde solutions, but while this method operates satisfactorily for solutions of moderate dilution, it is not applicable to solutions of very low concentrations. Various other expedients such as distillation under low pressure and the use of certain azeotropic agents have been suggested, but none of those thus far proposed has been found to be successfully applicable to the concentration of dilute solutions.

This invention has as its principal object to provide a process for concentrating dilute aqueous solutions of formaldehyde to solutions containing 37–40% by weight or more of dissolved formaldehyde. A further object is to provide a process of concentrating dilute aqueous solutions of formaldehyde by an improved distillation procedure. A still further object is to provide a process of concentrating aqueous formaldehyde solutions of extreme dilution by azeotropic means. Another and specific object is to provide a process of concentrating aqueous solutions containing amounts of formaldehyde as low as 2–5% by weight. Other objects will appear hereinafter.

These objects are accomplished by the following invention which, in its broader aspects, comprises adding to the dilute aqueous formaldehyde solution it is desired to concentrate, an appropriate amount of a ketone entrainer and distilling from the mixture a ketone-water azeotrope. We have found that when ketones having the graphic formula

wherein $R_1$ is an alkyl radical of 1–3 carbon atoms and $R_2$ is an alkyl radical of 3–8 carbon atoms, is used as the entrainer, particularly under vacuum conditions, an extremely effective removal of the water content may be accomplished and solutions, even of extreme dilution, such as those containing 2–5% formaldehyde and 98–95% water, may be effectively concentrated to solutions containing 35–40% or more formaldehyde. Among the various ketones represented by the above-mentioned graphic formula which have proved especially efficacious in the practice of our process are methyl isobutyl ketone, methyl secondary butyl ketone, methyl-n-propyl ketone, methyl-n-amyl ketone, methyl secondary amyl ketone and methyl isoamyl ketone.

In the following examples and description we have set forth several of the preferred embodiments of our invention, but they are included merely for purposes of illustration and not as a limitation thereof.

Our improved process may be carried out either batchwise or as a continuous process. While the process may be operated at atmospheric pressure, we have found that greatly improved results are obtained when the process is carried out under vacuum conditions, that is under a pressure, for example, of 50–75 mm. of mercury. Presumably the increase in yields obtained by operating under vacuum conditions can be attributed to the fact that vaporization may be accomplished at much lower temperatures than is the case at atmospheric pressure, with the result that the formaldehyde monohydrate or methylene glycol is less dissociated into its component parts than would be the case under conditions in which it were necessary to employ higher temperatures.

Our process will be more fully understood by reference to the carrying out of both continuous and batch-type operations.

Referring to the single figure of the accompanying drawing, a formaldehyde solution containing, for example, 10% by weight formaldehyde is withdrawn in metered amounts from tank 1 through valved conduit 2 and continuously introduced at about the 4th or 5th plate of a 12-15-plate distilling column 3 provided with means (not shown) for maintaining a vacuum therein. Column 3 is connected, as shown, to a base heater 4 which in turn is connected by valved conduit 5 to storage tank 6 or other appropriate storage vessel.

The desired ketone entrainer, such as methyl isobutyl ketone, for example, is charged to the lower part of column 3, the entrainer flowing through valved conduit 8 and rotameter 9 at such a rate as to provide in the column a ratio of entrainer to water corresponding to a slight excess of the entrainer over what is necessary to produce an azeotropic mixture. Heat is applied to base heater 4 by an appropriate means such as steam coils, electrical resistance units or otherwise, thereby causing an azeotropic mixture of water and ketone in vapor form to pass up through column 3 and thence through conduit 10 to condenser 11 which may be provided, as shown, with appropriate means for circulation therethrough of an appropriate cooling fluid such as water.

The condensed ketone-water azeotrope passes by conduit 12 to decanter 13 where the liquid separates into two layers. The top layer, which is substantially pure ketone, overflows from the decanter, passing through conduit 14 to tank 7 for recycling through the distilling column. The lower liquid layer, which is largely water containing some dissolved ketone and a small amount of formaldehyde, passes through conduit 15, provided with a liquid seal as shown, into the upper portion of a second azeotropic column 16, the function of which is to separate the ketone content. This column 16 is provided similarly to column 3 with a base heater 17 which is supplied with appropriate heating means.

When heat is applied to base heater 17, an azeotropic mixture of ketone and water passes in vapor form from the top of column 16 through conduit 18 to a condenser 19 similar in all respects to condenser 11. The condensate from 19 flows into a decanter 20 where separation of the liquid into two layers takes place. The top layer, which is substantially pure ketone, overflows from the top of decanter 20 and is conveyed through conduit 21 to tank 7 for reintroduction into the first column.

Concentrated formaldehyde solution collects in base heater 4 from which it may be continuously withdrawn through valved conduit 5 to storage tank 6. The water which has been separated from the original aqueous formaldehyde solution undergoing concentration collects in base heater 17 from which it is continuously withdrawn through valved conduit 22 and discarded, since it contains formaldehyde in a concentration too small for economical recovery.

While the above description of our process and apparatus is designed primarily to illustrate a continuous operation, if desired the process may be operated batchwise. When operating continuously the aqueous formaldehyde is introduced at an intermediate point in column 3. With a very short column it may be preferable to introduce the solution at or near the top of the column and, under some circumstances, to preheat the formaldehyde solution to the temperature of the vapors in the column at the point of entry. When operating in this manner the ketone entrainer is introduced toward the bottom of the column. With a longer column the solution may be introduced at an intermediate point lower down the column.

When it is desired to operate batchwise the aqueous formaldehyde will be introduced directly into the base heater 4 by means of an extension 23 of conduit 2. The ketone entrainer may be introduced, either toward the bottom of the column, as when operating continuously, or it may be introduced directly into the base heater 4 and mixed with the aqueous formaldehyde. When operating in this manner the concentrated formaldehyde withdrawn from base heater 4 contains small amounts of entrainer which can be flashed off in a separate column. In any event, the ketone entrainer passing up through the column in admixture with the aqueous formaldehyde forms an azeotropic mixture with the water present and continually removes it from the solution. The ketone entrainer is continuously recycled through the column, thus withdrawing more and more of the water from the aqueous formaldehyde when operating batchwise. The finally concentrated formaldehyde may be removed from the base heater 4 after completion of the distillation, that is after the desired amount of water has been removed.

When operating continuously, as explained above, the aqueous formaldehyde will be continuously fed to the base heater and the concentrated solution continuously removed therefrom. Under some circumstances, such as where one does not wish to recover the maximum recoverable amount of formaldehyde, it is possible to operate the process either batchwise or continuously with one distilling column. However, in general, it is more economical to employ two columns, and recover the maximum amount of ketone entrainer and return it to the main distillation and to discard water containing less than about 1–2% formaldehyde.

It will of course be understood that the degree of concentration can be determined by regulating the relative rates of flow of dilute formaldehyde solution and entrainer, and the rate of application of heat to the base heater.

The following examples will serve further to illustrate the principles of our invention.

*Example 1*

A 300 cc. sample of formaldehyde solution having a density of 1.026 and containing 10.9 grams of formaldehyde per 100 cc. was mixed with 100 cc. of methyl isobutyl ketone and subjected to distillation in a distilling flask, or in a column such as column 3 of the drawing at a pressure of 67-72 mm. corresponding to a boiling point of 34-36° C. The top layer of the distillate which is methyl isobutyl ketone, was recycled to the distillation. At the end of the distillation the residuum in the flask or base heater contains 32.9 grams of formaldehyde per 100 cc. This represents a recovery of 83% of the formaldehyde in concentrated form. The water which was distilled off and discarded contained only 2.5 grams formaldehyde per 100 cc.

*Example 2*

A dilute aqueous formaldehyde solution containing 3.85 grams of formaldehyde per 100 cc. was subjected to azeotropic distillation by the procedure of Example 1, employing methyl isobutyl ketone as the entrainer, and operating the still at a pressure of 75 mm. of mercury corresponding to a boiling point of the liquid of 34.5° C. Distillation was continued until the residuum contained 19.25 grams of formaldehyde per 100 cc. of condensate, thus giving a yield of 82%.

*Example 3*

To test the effect of an increase of pressure on the efficiency of the process, the following procedure was carried out: a dilute aqueous solution containing the same concentration of formaldehyde as that present in the solutions treated in accordance with Examples 1 and 2, was distilled azeotropically, employing methyl isobutyl ketone as the entrainer and operating the still at atmospheric pressure. The boiling point was 87.9° C. After operating the still for the same length of time as in the previous examples, the residuum in the distilling flask or base heater contained 18.44 grams of formaldehyde per 100 cc. of liquid as compared with the original concentration of 10.9 grams per 100 cc. The yield of recovered formaldehyde in concentrated form was thus 29% as compared to 82-83% when employing vacuum conditions. The increase in efficiency of the process under such conditions is due to the fact that the distilling temperature at the lower pressures is proportionately reduced and the tendency of the formaldehyde, probably present in the solution as methylene glycol, to dissociate is very slight. However, this fact does not account for the entire result because separation of the water cannot be accomplished merely by distilling formaldehyde solutions alone under reduced pressure, that is, without an entrainer, even with a high degree of fractionation.

*Example 4*

A dilute aqueous solution of formaldehyde containing from 2-5% by weight formaldehyde is subjected to azeotropic distillation in an apparatus such as that illustrated in the single figure of the drawing. The solution is fed into the column, which may have twelve to fifteen plates, at a point in proximity to the fourth or fifth plate, preferably being heated to the temperature of the vapors in the column at that point. An amount of methyl isoamyl ketone is continuously introduced into the lower part of the column at a rate sufficient to maintain a slight excess of the ketone over that necessary to provide an azeotropic mixture of the water being vaporized. The column is operated at a pressure of 50-75 mm. of mercury.

The methyl isoamyl ketone-water azeotrope issuing as vapor from the column is condensed and the condensate led to the decanter where it continuously separates into two layers, the topmost of which is methyl isoamyl ketone and the lower layer of which is water containing a few per cent of dissolved ketone. The upper ketone layer overflows from the decanter and is recycled into the distillation column.

The ketone-water mixture issuing from the lower portion of the decanter is conveyed to a second still and subjected to distillation. The vapors withdrawn from this column, which are composed of the ketone-water azeotrope, are condensed and the condensate subjected to decantation as before, the ketone layer being led back and introduced into the first distilling column. The water layer which contains a negligible amount of formaldehyde is discarded.

While we have chosen to illustrate our process by reference to examples in which we employ certain specific ketones, it will of course be understood that any of the ketones represented by the graphic general formula given above will operate satisfactorily. It will be evident to those skilled in the art that many modifications in the procedure and the apparatus employed for carrying out our process may be made within the scope of our invention.

As to the matter of pressures, while we can operate at atmospheric pressure, we prefer to operate under vacuum conditions, as for example, a vacuum corresponding to 50-75 mm. of mercury, particularly since this enables us to employ water at usual atmospheric temperatures as the cooling medium for the condensation. On the other hand, if pressures below 50 mm. of mercury are employed, as for example, 10-25 millimeter or lower, it will, in general, be necessary to employ a refrigerated cooling medium on the condenser. The use of such low pressures and the use of refrigeration for the cooling medium may be desirable, particularly if high concentrations of formaldehyde from very dilute solutions are desired.

While our process may be applied to the concentration of aqueous formaldehyde solutions in general, as for example, those containing relatively large amounts of formaldehyde, such as 35-40% or more, its particular value and chief distinguishing feature is that it may be successfully applied to concentration of the more dilute solutions, such for example, as those containing 10%, 5%, 2% or even less of dissolved formaldehyde. As previously indicated, the degree of concentration ultimately attained in any given case will depend upon what is the desired composition of the final product and the specific distillation conditions will be selected and carried out in accordance with our invention to produce the result desired.

It will thus be seen that we have provided a novel, efficient, and economical solution to a problem of long standing in the treatment of aqueous solutions of formaldehyde, particularly the concentration of the more dilute aqueous solutions which have hitherto, to all intents and purposes, defied rectification by known distillation procedure.

What we claim is:

1. The process of concentrating a dilute aqueous solution of formaldehyde by azeotropic distillation which comprises mixing with the solution methyl isobutyl ketone, distilling from the mixture at a pressure of 50 to 75 mm. of mercury a methyl isobutyl ketone-water azeotrope, condensing the azeotrope, separating the azeotrope into a water layer and a methyl isobutyl ketone layer by decantation and returning the methyl isobutyl ketone layer to the distillation.

2. The process of concentrating a dilute aqueous solution of formaldehyde by azeotropic distillation which comprises mixing with the solution methyl isobutyl ketone, distilling from the mixture at a pressure of 10 to 75 mm. of mercury a methyl isobutyl ketone-water azeotrope, condensing the azeotrope, separating the azeotrope into a water layer and a methyl isobutyl ketone layer by decantation and returning the methyl isobutyl ketone layer to the distillation.

3. The process of concentrating a dilute aqueous solution of formaldehyde by azeotropic distillation which comprises mixing with the solution methyl isobutyl ketone, distilling from the mixture at a pressure of 50 to 75 mm. of mercury a methyl isobutyl ketone-water azeotrope, condensing the azeotrope, separating the azeotrope into a water layer and a methyl isobutyl ketone layer by decantation, returning the methyl isobutyl ketone layer to the distillation and continuing the distillation until the concentration of formaldehyde in the aqueous solution is from 37 to 40 per cent by weight.

RUDOLPH LEONARD HASCHE.
JOSEPH H. BRANT.

REFERENCES CITED

The following references are of record in the file of this patent:

UNITED STATES PATENTS

| Number | Name | Date |
|---|---|---|
| 1,948,069 | Fuchs et al. | Feb. 20, 1934 |
| 2,050,235 | Othmer | Aug. 4, 1936 |
| 2,170,834 | Othmer | Aug. 29, 1939 |
| 2,256,497 | Reynolds | Sept. 23, 1941 |

OTHER REFERENCES

Karrer, "Organic Chemistry," published 1938 by "Elsevier," distributed by Nardeman Publishing Company, Inc., New York, New York, copy in Division 25, page 147.